United States Patent Office 3,488,268
Patented Jan. 6, 1970

3,488,268
IRRADIATION PROCESS FOR PREPARING
GRAFT COPOLYMERS
David Tanner, Charlottesville, Va., assignor to E. I. du
Pont de Nemours and Company, Wilmington, Del., a
corporation of Delaware
No Drawing. Continuation of application Ser. No. 40,503,
July 5, 1960. This application Dec. 2, 1965, Ser. No.
511,028
Int. Cl. C08g 41/02; B01j 1/10
The portion of the term of the patent subsequent to
Sept. 5, 1978, has been disclaimed
U.S. Cl. 204—159.15                            6 Claims

ABSTRACT OF THE DISCLOSURE

A process is provided for preparing graft copolymers which comprises exposing to 0.01 to 160 M rad of ionizing radiation a composition containing (A) a solid shaped structure of a water-insoluble synthetic condensation product having recurring $$-\overset{|}{\text{N}}-$$

atoms as an integral portion of the polymer chain, (B) an ethylenically unsaturated organic acidic compound or salt thereof and (C) from about 0.001 to 10% by weight of a free radical polymerization inhibitor selected from quinones, polyphenols, aromatic nitro compounds, dithiocarbamates, sulfur, ional and methylene blue. Suitable condensation products include polyamides, polyurethanes, polyureas and polysulfonamides.

---

This application is a continuation of U.S. application No. 40,503, filed July 5, 1960, and now abandoned, which is a continuation-in-part of U.S. application No. 719,659, filed Mar. 6, 1958, now U.S. Patent No. 3,099,-631, which in turn is a continuation-in-part of U.S. application No. 595,210, filed July 2, 1956, and now abandoned.

This invention relates to improvement in the method of making graft copolymers. More particularly, it concerns a method of making graft copolymers whereby inhibitor-containing monomers may be used, as compared to prior art grafting processes wherein removal of such inhibitor is required or desirable.

STATE OF THE ART

U.S. application Ser. No. 613,984 to David Tanner, filed Oct. 4, 1956, and now U.S. Patent No. 2,999,056, described a process whereby certain useful graft copolymer products are prepared by soaking a polymer substrate in an unsaturated organic acid or its salt and thereafter exposing to ionizing radiation. Free radical sites are produced on the substrate polymer, which serve to initiate vinyl polymerization whereby the unsaturated acid or salt is polymerized to form a chain attached (grafted) to the polymer backbone. When an unsaturated acid is used as the monomer, the graft copolymer is usually subsequently converted to its inorganic salt. Textiles produced from these graft copolymers (in the form of salts) show unexpected resistance to flash heat or hole-melting (from cigarette ashes). Especially suitable polymer substrates for the preparation of these graft copolymer textiles are the nitrogenous condensation polymers such as the polyamides.

Prior art methods for preparing such graft copolymers have required heating the polymer substrates in the presence of a conventional free radical polymerization initiator (e.g. ammonium persulfate) and a vinyl monomer. Alternatively, the combination may be exposed to ultraviolet radiation in the presence of a photoinitiator. Both of these general processes have usually required that the polymerization inhibitor, customarily present in reactive vinyl monomers, be removed prior to initiating the grafting reaction. This additional process step is not only expensive, but in some cases is definitely hazardous since uninhibited vinyl monomers such as, for example, pure acrylic acid, may polymerize with explosive violence if the inhibitor is removed. Suitable precautions must be taken to avoid this danger in carrying out the separation. In addition, the graft reaction is usually carried out in vacuum or in an inert atmosphere, due to the inhibiting effect of atmospheric oxygen.

Where removal of the polymerization inhibitor by distillation techniques has not been practical, for example, where the monomer is substantially non-volatile at practical distillation temperatures and pressures, it has been customary to employ an additional amount of polymerization initiator in order to overcome the effect of the inhibitor. This results in loss of monomer as homopolymer, as well as increased amounts of catalyst residues remaining after the grafting reaction. Such catalyst residues in many cases are found to be harmful in that discoloration, weakening or increased sensitivity to sunlight exposure are observed.

OBJECTS

It is, therefore, an object of the present invention to provide a process for preparing a graft copolymer whereby the necessity for removing the polymerization inhibitor is avoided.

An additional object is to provide a process for forming a graft copolymer, especially a graft copolymer in textile form, which avoids the need for operating in an inert atmosphere.

A further object is to provide a process for forming a graft copolymer whereby the pressure of catalyst residues is eliminated.

These and other objects will become apparent in the course of the following specification and claims.

THE INVENTION

In accordance with the present invention a process of forming a graft copolymer is provided which process comprises exposing to 0.01 to 160 M rad of high energy ionizing radiation the combination of (A) a solid shaped structure of a water insoluble synthetic high molecular weight substantially linear nitrogenous condensation polymer characterized by recurring $$-\overset{|}{\text{N}}-$$

atoms as an integral part of the polymer chain contacted with (B) a member of the class consisting of (a) an unsaturated acid polymerizable by free radical mechanisms and (b) the salt thereof and with (C) a free-radical polymerization inhibitor.

The process of the instant invention is preferably carried out by irradiating a substrate polymer as a solid, shaped structure into which the unsaturated acidic compound has penetrated by diffusion. Irradiation of the combination in the solid state is much more efficient than carrying out the irradiation in solution or in the melt, since by this technique free radicals produced upon the solid polymer substrate are immobilized and hence retained for reaction with the monomer. In addition, termination and crosslinking reactions or reaction with atmospheric oxygen or other inhibitors are minimized.

DEFINITION

The term "synthetic linear nitrogenous condensation polymer" is intended to describe a class of substantially linear condensation polymers in which nitrogen atoms occur as part of the polymer molecule "backbone." The best known representatives of this class are the polyamides, which are characterized by recurring

links in the polymer chain, when R may be hydrogen or organic radical. High molecular weight fiber-forming polyamides, now well known as "nylons," are preferred in forming the product of this invention.

Other well-known polymers comprehended in the defined class are the polyurethanes, characterized by recurring

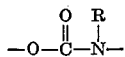

groups, and polyureas, characterized by

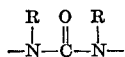

groups. Also included are those polymers with recurring main-chain links such as

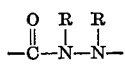

and the like. The R substituents on the nitrogen are preferably hydrogen, but may be a monovalent radical, preferably hydrocarbon radical. In addition to the above, poly sulfonamides are useful.

The polymers defined above are preferably free from aliphatic unsaturation.

The above definition also includes copolymers wherein the defined condensation polymers form one of the components, preferably to the extent of at least 1%. The preferred polymers of the above class are the fiber-forming polyamides, which are characterized by recurring carbonamide linkages as an integral part of the polymer chain.

The limitation to "water-insoluble" polymers of the defined chemical class is meant to include those polymers, in extended physical form (e.g., film, fabric or fiber), which may be water-extracted repeatedly without dissolution, and preferably without substantial loss (e.g., over 10-15%) in weight.

By a "graft copolymer" is meant the polymer obtained by attaching side chains of polymer species B to the main or "backbone" chain of a linear, fiber-forming polymer of species A. This type of polymer may be conveniently prepared by forming free radicals on suitable carbon atoms of polymer A in the presence of, or prior to subsequent contact with, a vinyl monomer of species B, whereby vinyl polymerization of B is initiated, and chains of polymer B grow upon the reactive sites of A. The free radicals which initiate grafting of B upon the backbone polymer A are conveniently produced by exposing A to ionizing radiation in the presence of the vinyl monomer B.

By "solid shaped structure" is meant any solid polymer form such as a flake, powder or comminuted particle which, when grafted by a modifier which is stable during customary shaping processes, may be reshaped after grafting to form an article of specific end use. Preferably, however, the shaped structure will be in the form in which it is finally used, such as, for example, a fiber, film, sponge or pellicle. It may be in the form of a woven, knitted or felted fabric, a paper, a bristle or artificial straw. By treatment of the substrate in this form, it is possible to control the location at which the unsaturated acid is grafted, e.g. near the surface, diffused to a substantial depth, or alternatively, penetrated throughout the bulk of the substrate. By this technique it is also possible to form a grafted product which it would be impossible to form should shaping be required following the grafting reaction. As an example, polyhexamethylene adipamide with acrylic acid grafted thereto is thermally unstable at polyamide melting temperatures, and hence is preferably grafted in its final shape.

By "ionizing radiation" is meant radiation with sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 ev. and above is effective for the process of this invention. The ionizing radiation preferred for forming free radicals and initiating grafting on the synthetic linear condensation polymer of this invention is high energy ionizing radiation, and has an energy equivalent to at least 0.1 million electron volts (mev.). Higher energies (10 to 15 mev.) are even more effective; the only known upper limit is imposed by available equipment. This radiation is generally classed in two types: high energy particle radiation, and high energy ionizing electromagnetic radiation. The effect produced by these two types of radiation is similar, the essential requisite being that the incident particles or photons have sufficient energy to break chemical bonds and generate free radicals.

By "high energy particle radiation" is meant an emission of high energy electrons or nuclear particles such as protons, neutrons, alpha particles, deuterons, or the like, directed so that the said particle impinges upon the solid polymer bearing the unsaturated amide. The charged particles may be accelerated to high speeds by means of a suitable voltage gradient, using such devices as a resonant cavity accelerator, a Van de Graaff generator, a betatron, a synchrotron, cyclotron, or the like, as is well-known to those skilled in the art. Neutron radiation may be produced by bombardment of selected light metal (e.g., beryllium) targets with high energy positive particles. In addition, particle radiation suitable for carrying out the process of the invention may be obtained from an atomic pile or from radioactive isotopes or from other natural or artificial radioactive material.

By high energy "ionizing electromagnetic radiation" is meant radiation produced when a metal target (e.g., gold or tungsten) is bombarded by electrons possessing appropriate energy. Such energy is imparted to electrons by accelerating potentials in excess of 0.1 million electron volts (mev.), with 0.5 mev. and over preferred. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma rays.

The irradiation is carried out using a Van de Graaff electron accelerator with an accelerating potential of 2 million electron volts (mev.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one M rad.

Radiation dosages may be given in units of "M rad" (millions of rads), a "rad" being the amount of high energy radiation of any type which results in an energy absorption of 100 ergs per gram of water or equivalent absorbing material. Alternatively, dosages may be indicated in terms of exposure in watt-sec./cm.$^2$. Unless otherwise indicated, the nylon fabric used in the examples is a taffeta prepared from polyhexamethylene adipamide filaments (i.e., 66 nylon).

The static propensity of the fabric is indicated in terms of direct current resistance in ohms measured at 78° F. and (except where indicated otherwise) in a 50% relative humidity atmosphere. High values indicate a tendency to acquire and retain a charge and are reported as the logarithm to the base 10, being designated "log R."

EXAMPLE I

A sample of nylon fabric is soaked in an aqueous solution containing 20% potassium acrylate and a minor amount of methylene blue inhibitor for a period of about 30 minutes. The sample is then irradiated with 2 mev. electrons as described above to a total dose of 33 M rad. It is thereafter given 15 standard washings, using hot detergent in tap water, followed by a tap water rinse, thus forming the calcium salt. After drying, an 11% weight gain is noted. The fabric is colored blue by adsorption and/or grafting of the dye. When the procedure of this example is repeated, using a fabric prepared from polycaproamide (6 nylon) filaments, similar results are obtained.

EXAMPLE II

The inhibitor may be present in a second monomer, even though not required to prevent premature polymerization of the unsaturated acid portion of the compositions. For example, a sample of nylon fabric is immersed in a mixture of 30 parts maleic anhydride, 70 parts methoxydecaethyleneoxy methacrylate monomer and 100 parts of water. The methoxydecaethyleneoxy methacrylate contains a minor amount of hydroquinone polymerization inhibitor. The sample is wrung out, wrapped in aluminum foil and is irradiated to a total dosage of 17 M rad (125 watt-sec./cm.$^2$) using the equipment and technique of Example I. The fabric is then subjected to 15 standard washings using hot detergent solution containing sodium ions as disclosed herein above. It is observed to have a much drier hand than an irradiated comparative control which was not immersed in the liquid mixture prior to irradiation. Hot ashes from a burning cigarette are flicked onto the liquid immersed, irradiated, washed fabric to determine its hole-melting tendency. Only a small brown stain results. Holes are immediately melted through the original fabric, whether irradiated or not.

EXAMPLE III

A portion of nylon fabric is soaked in an aqueous solution of potassium styrene sulfonate and is then irradiated with a dose of 17 M rad, following the procedure described hereinabove. The sample is rinsed in methanol to remove excess monomer, followed by a 30-minute washing in acetone to remove surface polymer. It is then given 10 standard washings in detergent, and its antistatic properties are tested. The log R value is 11.6, compared to 13.2 for untreated nylon.

When the test is repeated using a highly purified potassium styrene sulfonate (96.5% pure monomer), in which the nylon sample is soaked (as a 25% aqueous solution), and is then irradiated to a dose of 12 M rad, the sample after washing shows a weight gain of 18.9%. When it is tested for antistatic properties, it has a log R value, after 25 washes, of 9.6. The sample is also resistant to hole-melting, is more resilient than an untreated 66 nylon control, and is more resistant to soiling by oily soils.

A lower radiation dose may be employed to produce equivalent modification when higher soaking and irradiation temperature are used. A nylon sample is soaked 15 minutes in a 30% aqueous solution of purified sodium styrene sulfonate held at 80° C., followed by irradiation to a dose of 1 M rad. After washing to remove homopolymer, a 23% weight gain is observed. When converted to the sodium salt, given 5 standard washings, the log R is 7.5, and the sample has a high degree of wet crease recovery. When the test is repeated, with 0.1% hydroquinone polymerization inhibitor added to the sodium styrene sulfonate treating solution, much less ungrafted homopolymer is obtained, representing a decreased loss for reagent; in addition, more uniform grafting is obtained.

Although any linear, high molecular weight, fiber- or film-forming, nitrogenous condensation polymer is suitable for the process of this invention, polyamides are preferred. Suitable polyamides are those synthetic linear polyamides which are prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid containing the repeating unit

wherein —X— and —Y— represent divalent aliphatic or cycloaliphatic groups and —Z— represents the

linkage. Polyhexamethylenedipamide and caproamide (i.e., "66" and "6" nylons) are typical. Other suitable polyamides are those having the repeating structure

wherein —A— is a divalent aromatic radical and —X— and —Z— are as previously defined. Polyhexamethylene terephthalamide is illustrative of such polymers. Additionally polyamides having repeating units such as

and

wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid, and the like. Copolyamides, condensation copolymers wherein the amide linkage is the predominant linkage and polyamide mixtures are also useful.

By an "unsaturated organic acid" as used herein is meant any acid and/or anhydride which contains at least one reactive vinylene or acetylenic group. Suitable unsaturated monoacids are acrylic, methacrylic, ethyl-acrylic, crotonic, propiolic, and styrene carboxylic acids, for example. Those unsaturated acids which are difunctional are highly useful. Examples of these are maleic, dichloromaleic, fumaric, butadiene dicarboxylic and itaconic acids. In addition to the acids, other derivatives such as acid chlorides, acid anhydrides, half acid esters, and half acid amides are also effective.

Any organic compound with aliphatic unsaturation, containing functional groups which are convertible to the acid form by hydrolysis (e.g., amides, esters, nitriles), oxidation (e.g., aldehydes or ketones) or the like is suitable. The unsaturated acid may also contain substituent groups which it may be desirable to attach to the polymer to confer other properties, such as enhanced static reduction, moisture repellance, dyeability, flame-proofness, etc. The said substituent groups may also be introduced by copolymerizing suitable monomers with the unsaturated acid.

In addition to the unsaturated carboxylic acids, other acids are useful. Such acids are the sulfonic acids (e.g., styrene sulfonic acid, ethylene sulfonic acid), unsaturated alkyl or aralkyl acid phosphates, phosphites, phosphonates, and phosphinates; acid alkyl sulfates and carbonates with unsaturated carbon-carbon bonds also have utility. Substituted acid phosphinate derivatives have especial utility because they also improve oxidation resistance. The acids may often be grafted as their preformed metal salts.

Mixtures of unsaturated acids as well as the penetration and grafting of one acid followed by the penetration and grafting of other acids are obvious technique modifications.

Any salt can be formed by simple treatment in aqueous solution, as already disclosed. Calcium ion is very readily picked up by the acid-modified polymer. If two or more cations are present in the treating solution, one ion will usually be picked up in preference to the other. For example, when both sodium and calcium ions are present, the calcium salt will be formed in preference to the sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, then similar hydrophilic and heat resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Among metallic salts suitable for use in the process of the present invention may be mentioned sodium carbonate, potassium carbonate, potassium acetate, calcium acetate, manganous acetate, zinc acetate, cupric acetate, cobaltous acetate, chromic acetate, lanthanum acetate and the like. Phosphate containing detergents such as "Tide" and even some hard waters are suitable as cation donors.

Inhibitors which may be present in the process of this invention without interfering with the grafting are those conventionally employed for preventing or controlling vinyl type free radical polymerizations. Thus, there are included quinone type compounds such as quinone, hydroquinone, di-t-butyl hydroquinone, the methyl ether of hydroquinone, 2,5-dihydroxy-1,4-benzoquinone, 1,4-naphthoquinone, chloranil, 9,10-phenanthraquinone. Also included are the polyphenol type inhibitors such as p-t-butyl catechol, picric acid, 4-amino-1-naphthol and the like. Aromatic nitro compounds such as nitrobenzene, trinitrobenzene, 2,4-dinitrochlorobenzene and the like. In addition, alkaline inhibitors, dithiocarbamates, sulfur, ionol, methylene blue, as well as oxygen and air are also comprehended.

The above mentioned inhibitors may be present in the amounts conventionally used to prevent polymerization during storage or shipment prior to anticipated use. Thus, the range of 0.001 to 10%, based on weight of monomer, is contemplated. The inhibitor may be present in the unsaturated acid, in its salt, or in a secondary monomer which is used to copolymerize with the chosen class of unsaturated acids. Alternatively, as explained hereinabove, the inhibitor may be oxygen from the air.

In determining the minimum dose of irradiation for any particular combination, the nature of the acid, the substrate and the amount of inhibitor present must be considered. For example, for unsaturated acids, such as acrylic acid, which are readily graftable, and polymer substrates that are readily activated by ionizing radiation (such as 66 nylon) a minimum dose of about 0.01 M rad is required to consume minor quantities of inhibitor (including oxygen) which may be present, and then initiate the grafting reaction. When the polymer substrate is left in contact with the polymerizable acid after this amount of radiation, the grafted chains continue to grow for relatively long periods of time. Thus, even though residual inhibitor remains in the treating solution, the very small dose of 0.01 M rad will initiate significant amount of grafting within the polymer substrate. It is of interest that this dose is attained with the equipment operated as described in the examples in about 1/100 seconds. Better results are obtained with a dose of about 0.1 M rad, which still permits a throughput of 100 meters per minute with conventional irradiation equipment. Higher doses, of the order of 1 M rad, are often preferred especially for grafting larger amounts of monomer, which dose is readily attained without significant degradation of the polymer substrate, at a convenient rate of production. Even higher doses may be used and may be especially beneficial when it is desired to crosslink as well as graft the polymer substrate. Dosages so high that substantial degradation of the shaped substrate occurs must obviously be avoided.

Many equivalent modifications will be apparent to those skilled in the art from a reading of the above without a departure from the inventive concept.

What is claimed is:

1. A process which comprises exposing to 0.01 to 160 M rad of high energy ionizing radiation a composition comprising (A) a solid shaped structure of a water insoluble synthetic high molecular weight substantially linear nitrogenous condensation polymer characterized by recurring $$-\overset{|}{\text{N}}-$$

atoms as an integral part of the polymer chain from the class consisting of polyamides, polyurethanes, polyureas and polysulfonamides contacted with (B) a member of the class consisting of (a) an aliphatically unsaturated organic acidic compound, which compound is polymerizable by free radical mechanisms and (b) the salt thereof and with (C) from about 0.001 to about 10% by weight based on the weight of (B) of a free radical polymerization inhibitor from the class consisting of quinones, polyphenols, aromatic nitro compounds, dithiocarbamates, sulfur, ional and methylene blue.

2. The process of claim 1 wherein the said polymer is polyhexamethylene adipamide.

3. The process of claim 1 wherein the salt of the said unsaturated acid is potassium acrylate.

4. The process of claim 1 wherein the said unsaturated acid is maleic anhydride.

5. The process of claim 1 wherein the said unsaturated acid is methoxydecaethyleneoxymethacrylate.

6. The process of claim 1 wherein the salt of the said unsaturated acid is potassium styrene sulfonate.

References Cited

UNITED STATES PATENTS

| 2,837,496 | 6/1958 | Vandenberg | 204—159.17 |
| 2,999,056 | 9/1961 | Tanner | 204—159.15 |
| 2,836,615 | 5/1958 | Heininger et al. | |

FOREIGN PATENTS

| 1,157,006 | 12/1957 | France. |

GEORGE F. LESMES, Primary Examiner

U.S. Cl. X.R.

260—857, 858